United States Patent [19]

Nakagawa et al.

[11] Patent Number: 4,786,832
[45] Date of Patent: * Nov. 22, 1988

[54] SUPPORTING MECHANISM FOR A MOVABLE MEMBER OF LINEAR PULSE MOTORS

[75] Inventors: Hiroshi Nakagawa; Toshiki Maruyama; Minoru Maeda, all of Ise, Japan

[73] Assignee: Shinko Electric Co., Ltd., Tokyo, Japan

[*] Notice: The portion of the term of this patent subsequent to Mar. 25, 2003 has been disclaimed.

[21] Appl. No.: 711,153

[22] Filed: Mar. 13, 1985

[30] Foreign Application Priority Data

Mar. 13, 1984 [JP] Japan .................................. 59-47863

[51] Int. Cl.⁴ ............................................. H02K 41/00
[52] U.S. Cl. .......................................... 310/12; 310/13
[58] Field of Search ................................. 310/12–14; 318/135

[56] References Cited

U.S. PATENT DOCUMENTS

| | | | |
|---|---|---|---|
| 3,716,731 | 2/1973 | Nilsson | 310/13 |
| 3,899,699 | 8/1975 | Griffing | 310/13 |
| 4,037,122 | 7/1977 | Bonner et al. | 310/12 X |
| 4,415,821 | 11/1983 | Wedman | 310/12 |
| 4,578,622 | 3/1986 | Nakagawa et al. | 310/12 |
| 4,594,520 | 6/1986 | Miwa et al. | 310/12 |
| 4,623,807 | 11/1986 | Nakamura | 310/12 |

Primary Examiner—Mark O. Budd
Attorney, Agent, or Firm—Kane, Dalsimer, Sullivan, Kurucz, Levy, Eisele and Richard

[57] ABSTRACT

A supporting mechanism for a movable member of a linear pulse motor in which a magnetic flux is generated in a gap defined between opposing faces of a stator and a movable member so that the movable member is movable parallel to the opposing face of the stator along a linear passage. The supporting mechanism includes a pair of holding members disposed above the stator; a plurality of first rolling members, rotatably held in the holding members to be in rolling contact with the movable member and the stator and to form the gap, for movably supporting the movable member; a pair of guide members, opposingly disposed on the stator across the linear passage, for defining opposite sides of the linear passage; and a plurality of second rolling members, rotatably held in the holding member to be in rolling contact with the guide members and opposite lateral edges of the movable member.

1 Claim, 3 Drawing Sheets

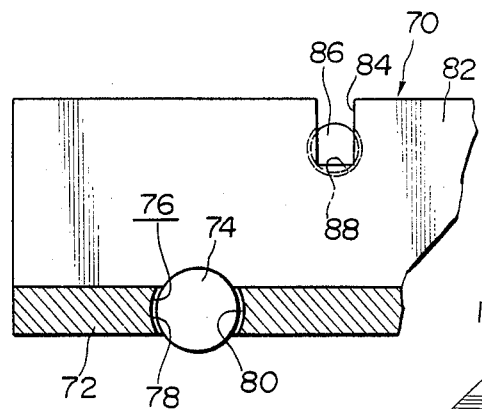
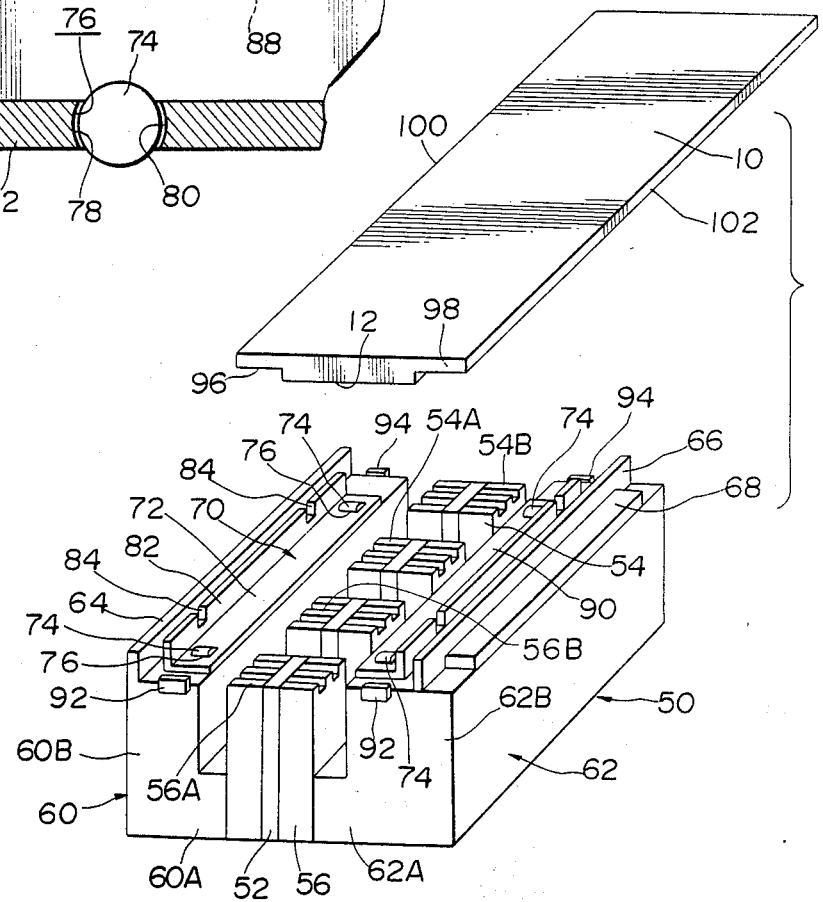

SUPPORTING MECHANISM FOR A MOVABLE MEMBER OF LINEAR PULSE MOTORS

BACKGROUND OF THE INVENTION

The present invention relates to a supporting mechanism for a movable member of linear pulse motors which are suitably used as motors for feeding heads of electronic printers, electric typewriters, floppy disc drives, etc.

As is well known, the linear pulse motor moves the primary magnetic flux generating unit or the secondary scale in a stepwise manner according to pulse signals supplied to the primary unit. A typical example of the prior art linear pulse motor of permanent magnet type is illustrated in FIG. 1A and B, in which the reference numeral 10 indicates a secondary scale in the upper face of which a comb-shaped toothed portion 12 is centrally and longitudinally formed. A guide rail 14 is attached to each lateral periphery of the upper face of the scale 10 adjacent to the toothed portion 12. Disposed above the upper face of this scale 10 is a primary magnetic flux generating unit 16, which is composed of iron cores or magnetic cores 18 and 20, side plates 22 and 24 for securing these cores 18 and 20 from their opposite sides, permanent magnets 26 and 28 magnetically coupled to the upper faces of the magnetic cores 18 and 20, coils 30-33 respectively wound around the magnetic poles 18A, 18B, 20A and 20B of the magnetic cores 18 and 20, and two pairs of rolling-contact bearings 38, for example, ball bearings, attached to the lower ends of the side plates 22 and 24 through shafts 40 and 40. When a predetermined pulse signals are supplied to the coils 30-33 the primary unit 16 stepwisely travels over the scale 10 by generating magnetic fluxes through the gap G between the magnetic poles 18A, 18B, 20A and 20B and the toothed portion 12. The scale 10 may be moved by fixing the magnetic flux generating unit 16.

Linear pulse motors are widely used in electronic printers and electric typewriters for feeding their heads which require functions of linear traveling and positioning. Recently there has arisen a strong need for reduction in dimensions and cost of the linear pulse motor as the printer and the electric printer are being reduced in volume and cost. In addition to these requirements reduction in thickness is required for the pulse motor used for feeding the head of the floppy disc drive.

As a result of study of these requirements of the linear pulse motor, we have found that the supporting mechanism using rolling-contact bearings places considerable limitations to the reduction in volume and thickness thereof. Furthermore, there is a general tendency that the reduction of the rolling-contact bearing in dimensions raises the cost thereof.

SUMMARY OF THE INVENTION

Accordingly, it is an object of the present invention to provide a supporting mechanism for a movable member of a linear pulse motor which achieves flattening and reduction in dimensions and cost.

With these and other objects in view, the present invention provides a supporting mechanism for a movable member of a linear pulse motor in which a magnetic flux is generated in a gap defined between opposing faces of a stator and a movable member so that the movable member is movable parallel to the opposing face of the stator along a linear passage. The supporting mechanism includes a pair of holding members disposed above the stator; a plurality of first rolling members, rotatably held in the holding members to be in rolling contact with the movable member and the stator and to form the gap, for movably supporting the movable member; a pair of guide members, opposingly disposed on the stator across the linear passage, for defining opposite sides of the linear passage; and a plurality of second rolling members, rotatably held in the holding member to be in rolling contact with the the guide members and opposite lateral edges of the movable member.

DESCRIPTION OF THE DRAWINGS

FIG. 2 is a perspective view of a linear pulse motor using a supporting mechanism constructed according to the present invention;

FIG. 3 is an enlarged partial sectional view of the holding plate in FIG. 2.

DETAILED DESCRIPTION OF THE PREFERRED EMBODIMENTS

Figure 1A:
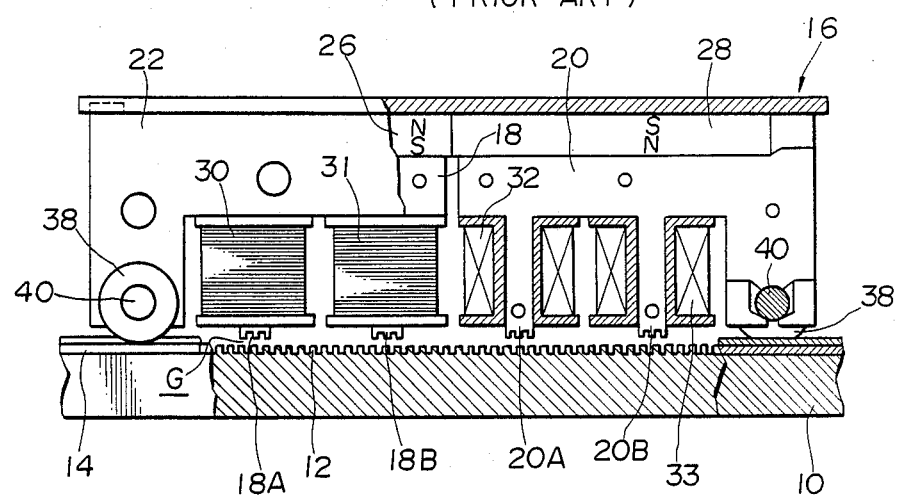
FIG. 1A is a side view, partly in section, of a typical example of the prior art.

Referring to FIG. 2, there is illustrated a linear pulse motor, according to the present invention, for use in a floppy disc drive (not shown), in which the primary magnetic flux generating unit 50 is fixed to a base member not shown and is used as a stator with magnetic poles 54A, 54B, 56A and 56B directed upwards and the scale 10 is used as a movable member. The scale 10 is jointed to a head (not shown) of the floppy disc drive which is supported to be movable in one direction. In this embodiment permanent magnets 52 and 53 are sandwiched between corresponding pieces of the magnetic cores 54 and 56. Coils which are to be wound around the magnetic cores 54 and 56 are omitted for illustration purposes. Reference numerals 60 and 62 indicate angular supporting members having shorter legs 60A and 62A thereof attached at their end faces to lower portions of opposite sides of the magnetic cores 56 and 58, the supporting members 60 and 62 being made of non-magnetic material such as stainless steel. The upper end faces of the longer legs 60B and 62B of the supporting members are set substantially equal in level to the upper end faces of the magnetic poles 54A, 54B, 56A and 56B. One supporting member 60 has an elongated plate-like guide member 64 integrally formed with the outer lateral edge of the upper end face of the longer leg 60B to project upwards. Also, the other supporting member 62 has another guide member 66 having the same shape as the guide member 64 and longitudinally formed with the upper end face of its longer leg 62B to project upwards. The other supporting member 62 has an elongated plate member 68 attached to the outer lateral periphery of the upper end thereof. The upper end faces of the supporting members 60 and 62 and the inner faces of the guide members 64 and 66 define the traveling passage of the secondary scale 10. On the upper face of the one supporting member 60 there is longitudinally disposed an angular holding plate 70 on the inner side (right side in FIG. 2) of the guide member 64. The horizontal leg 72 of the holding plate 70 has a pair of rollers 74 rotatably fitted in and retained in respective retaining holes 76 formed through it, with the axis of each roller 74 directed horizontally to cross the horizontal leg 72. As clearly shown in FIG. 3, the front and rear walls 78 and 80 of each hole 76 are circularly recessed to rotatably retain the roller 74 in it and each roller 74 vertically projects parts of its rolling face beyond the horizontal leg 72. Similarly, the vertical leg 82 of the holding plate 70 is provided in its upper end with a pair of cutouts 84 into each of which a ball 86 is rotatably fitted to project inwardly and outwardly parts thereof from the vertical leg 82. The bottom portion of each cutout is spherically recessed at 88 to rotatably retain the ball 86 in it. The other supporting member 62 is provided above the upper end thereof with another holding member 90 having the same shape as the holding member 70. Also, this holding member 90 has a pair of rollers 74 and a pair of balls 86 in the same manner as in the holding member 70. The holding nembers 70 and 90 are supported on the upper ends of respective supporting members 60 and 62 by contacting the rollers 74 with those upper ends. Each of the supporting members 60 and 62 is provided at the upper portions of the front and rear ends with box-shaped retaining members 92 and 94 respectively formed to project upwards from the upper end of its longer legs 60B, 62B, for preventing the travel of the corresponding holding member 70, 90 beyond the retaining members 92, 94 by abutting against the corresponding ends of the holding member 70, 90.

Figure 1B:
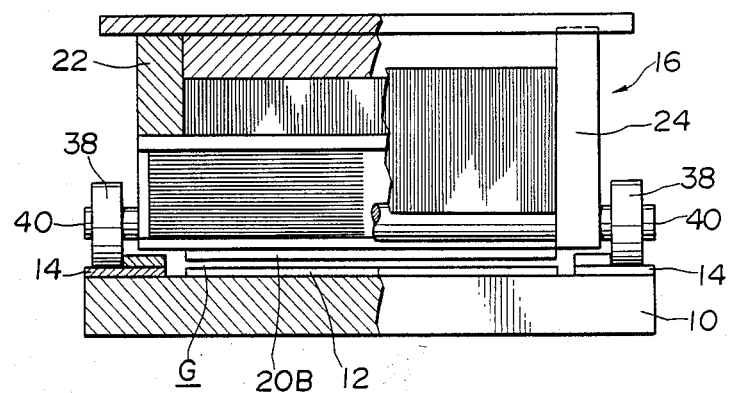
FIG. 1B is a front view, partly in section, of the linear pulse motor in FIG. 1A.

The scale 10 is placed above the primary magnetic flux generating unit 50 so that the rollers 74 come into contact with opposite lateral peripheral portions 96 and 98 of the lower face of the scale 10 to thereby face the toothed portion 12 to the magnetic poles 54A, 54B, 56A and 56B so as to form a Gap G (as shown in FIG. 1). In this state, the opposite lateral edges 100 and 102 of the scale 10 come into contact with corresponding balls 86 which are brought into contact with the inner walls of corresponding guide members 64 and 66, so that the crosswise travel of the scale 10 is prevented by the balls 86. With such a construction, the scale 10 is supported by the supporting members 60 and 62 to be movable only fore and aft. When a series of pulse signals are supplied to the coils in this state, the scale 10 is moved a predetermined distance forwards or backwards. In this event, the holding members 70 and 90 move a half distance of the travel of the scale 10 and are stopped by abutting against the retaining members 92 or 94.

Figure 4:
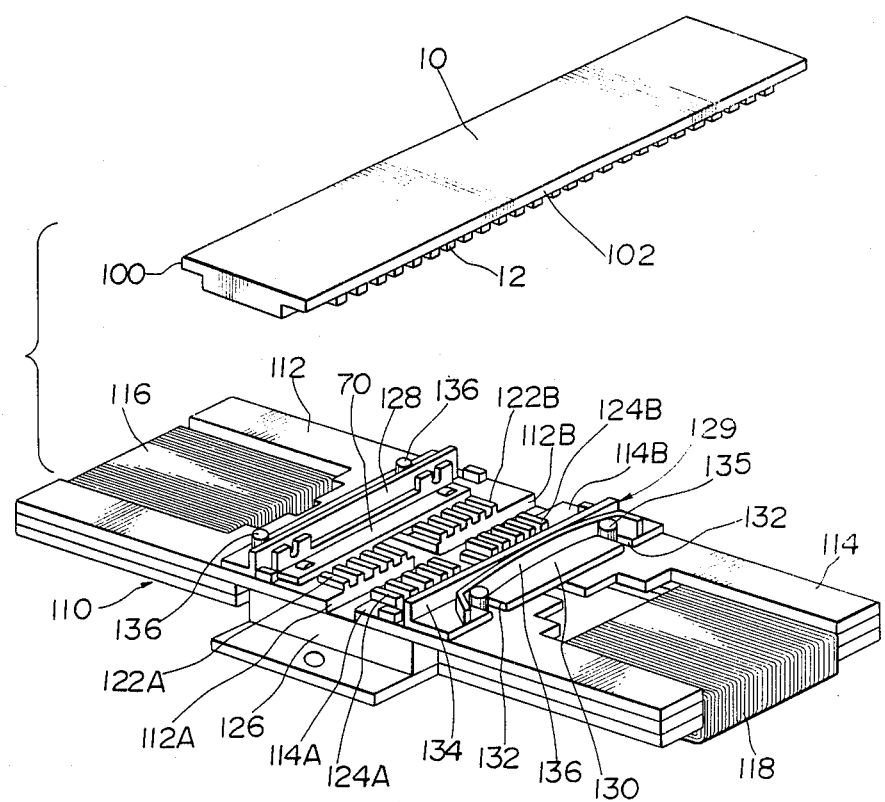
FIG. 4 is a perspective view of a second embodiment of the present invention.

FIG. 4 illustrates a second embodiment of the present invention which is also used for a floppy disc drive but is considerably different from the first embodiment in the primary magnetic flux generating unit 50. Reference numerals 112 and 114 designate substantially U-shaped magnetic cores horizontally disposed to opposingly place corresponding pole pieces 112A and 114A and 112B and 114B. The central or web portions, not specifically shown, of the cores 112 and 114 have coils 116 and 118 wound around them, respectively. The magnetic poles 112A, 112B and 114A and 114B respectively have toothed portions 122A, 122B, 124A and 124B formed in their upper peripheries. The magnetic cores 112 and 114 have a permanent magnet (not shown) attached to the lower faces of their magnetic poles to be magnetically coupled.

Another distinction of the second embodiment over the first embodiment is the supporting mechanism of the scale 10, to which scale is jointed a head (not shown) of a floppy disc drive. The magnetic cores 112 and 114 are respectively provided on the upper faces of their arms near the toothed portions 122A, 122B, 124A and 124B with angular guide members 128 and 129 so that the guide members 128 and 129 are parallel to the line of travel of the scale 10. The guide members 128 and 129 define the passage of travel of the scale 10 together with the upper faces of the pole pieces 112A, 112B, 124A and 124B. The one guide member 129 has a pair of guide cutouts 132 formed in the edge of its horizontal leg 130 to extend toward the vertical leg 134. Two pins 135 vertically fixed to corresponding arms of the core 114 are slidably fitted into corresponding guide cutouts 132 so that the guide member129 is movable across the travel passage of the scale 10. Between the vertical leg 134 and the pins 135 there is disposed an arcuate leaf spring 136 to resiliently contact at its central portion with the inner face of the vertical leg 134 and at its opposite end portions with the pins 135 so that the guide member 129 is resiliently urged in a direction to narrow the width of the passage of the scale 10, i.e., toward the other guide member 128. On the other hand, the other guide member 128 is fixed to the upper face of the magnetic core 112 by pins 136.

Also, in this embodiment, the scale 10 is supported above the secondary magnetic flux generating unit 110 by bringing the rollers 74 into contact with opposite lateral peripheries of the lower face of the scale 10 with the pole pieces 122A, 122B, 124A and 124B vertically spaced from the toothed portions 12 with a gap G. The holding members 70 and 90 are also disposed between corresponding guide members 128, 129 and toothed portions 122A, 122B and 124A, 124B. It will be appreciated that in this embodiment the scale 10 is prevented from moving laterally with higher accuracy since the leaf spring 136 resiliently biases the guide member 129 toward the scale 10 so that the lateral edges 100 and 102 of the scale 10 are brought into contact with the balls 86.

The supporting mechanisms above described are less complicated in structure and smaller in number of parts than conventional supporting mechanisms which use rolling-contact bearings, and hence achieve reduction in both volume and cost. Furthermore, they use the rollers and balls for bearing the movable member which are much smaller in diameter than the rolling-contact bearing, and thus reduction in thickness is also achieved.

The magnetic flux supporting units 50 and 110 may be used as the movable member in which case the units must be suitably supported to travel along the scale 10 which is fixed and serves as the stator. Further, the magnetic flux generating units 50 and 110 may be disposed above the scale 10, that is, the linear pulse motors are used upside down in which case the scale 10 may be fixed and used as the stator while the flux generating units 50 and 110 are used as the movable member or the scale may be used as the movable member while the units are used as the stator.

Although in the above-described embodiments the rollers and the balls are used as the rolling members of the holding members, the rolling members may consist of either rollers or balls. The rollers and the balls are not restricted in number and mounting positions to those shown in the embodiments. The number of both the rollers and the balls must be more than two for each holding member, that is, there must be at least two rollers and one ball or at least one roller and two balls. The rollers, balls and holding members may be made of any conventional suitable material such as, for example, nylon.

The present invention may be applied to the variable reluctance type linear pulse motor in which case no permanent magnet is used.

The walls of the cutouts and retaining holes may have grooves for storing a lubricant oil and for supplying it to the rollers and the balls.

What is claimed is:

1. In a supporting mechanism for a movable member of a linear pulse motor in which a magnetic flux is generated in a gap defined between opposing faces of a stator and a movable member so that the movable member is movable parallel to the opposing face of the stator along a linear passage, the improvement which comprises:
   (a) a pair of holding members, disposed above the stator;
   (b) a plurality of first rolling members, rotatably held in the holding members to be in rolling contact with the movable member and the stator and to form the gap, for movably supporting the movable member;
   (c) a pair of guide members, opposingly disposed on the stator across the linear passage, for defining opposite sides of the linear passage; and
   (d) a plurality of second rolling members, rotatably held in the holding members to be in rolling contact with the guide members and opposite lateral edges of the movable member wherein one of the guide members are provided to be movable in a direction to cross the linear passage, and wherein there is provided means for urging the one guide member toward the other.

* * * * *